March 23, 1965     A. SPRAGUE     3,174,798
AUTOMOBILE SAFETY BELT
Filed Sept. 18, 1963     2 Sheets-Sheet 1
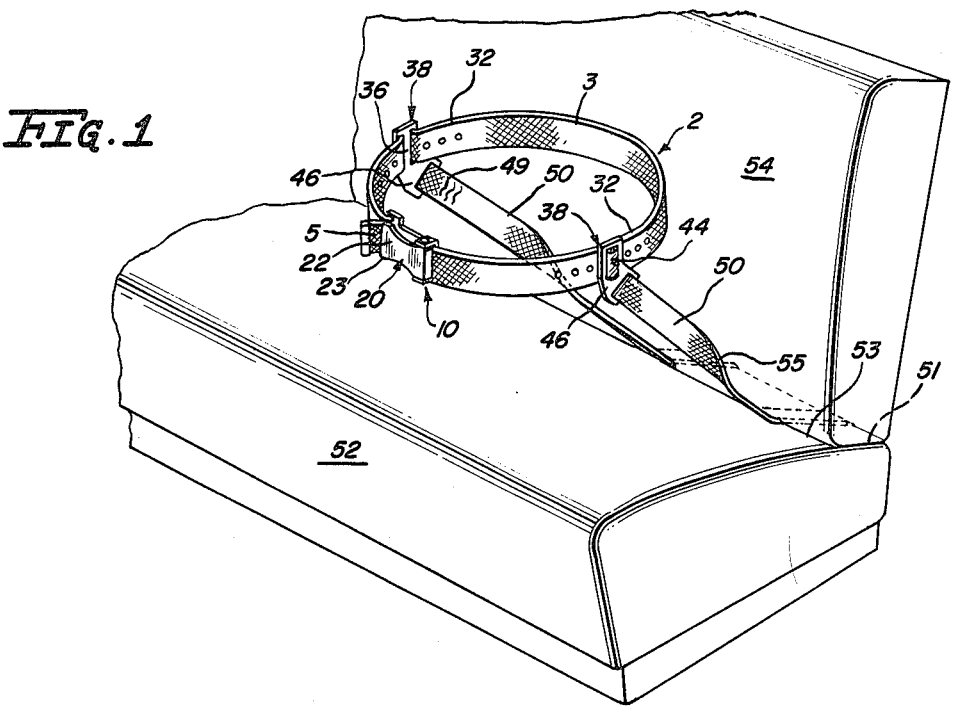
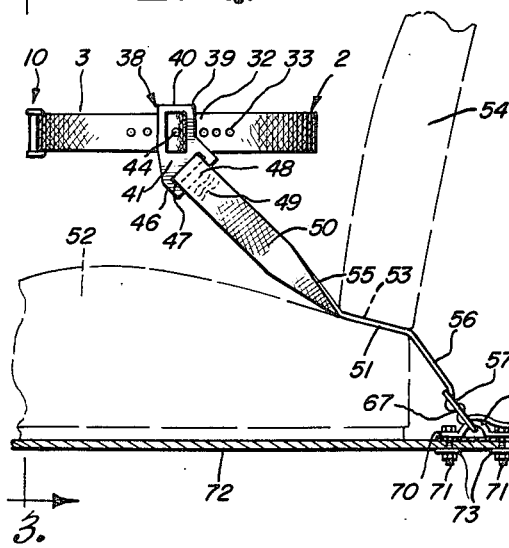
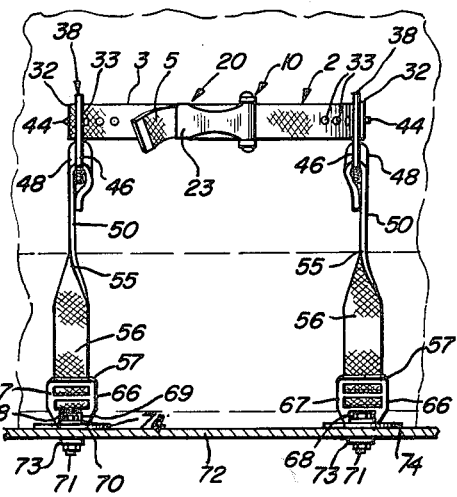
INVENTOR.
Arthur Sprague
BY John J. Kowalik
Atty.

March 23, 1965 A. SPRAGUE 3,174,798
AUTOMOBILE SAFETY BELT
Filed Sept. 18, 1963 2 Sheets-Sheet 2
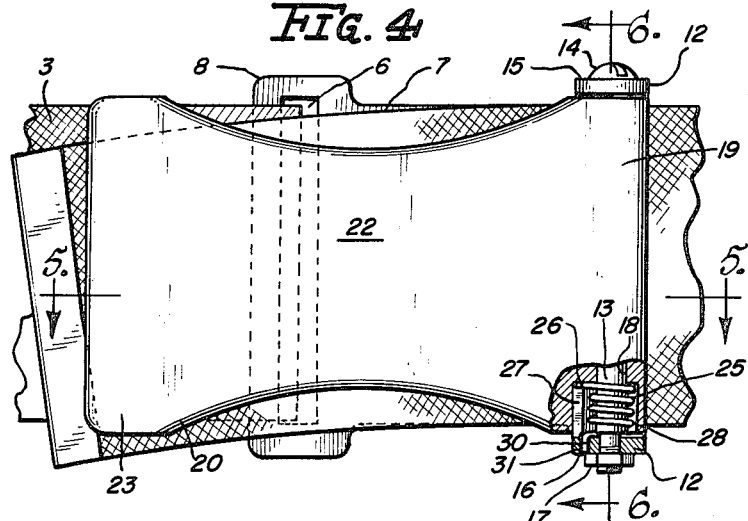
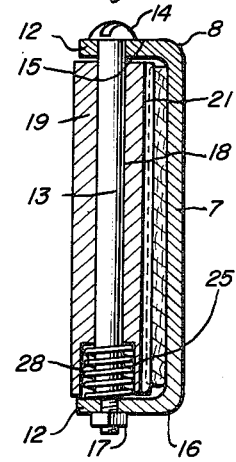
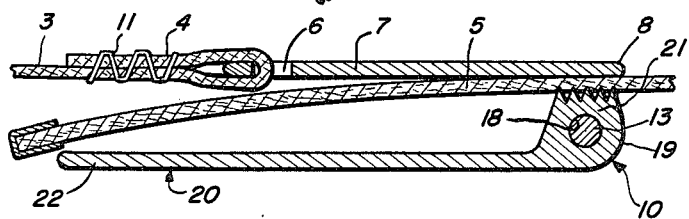
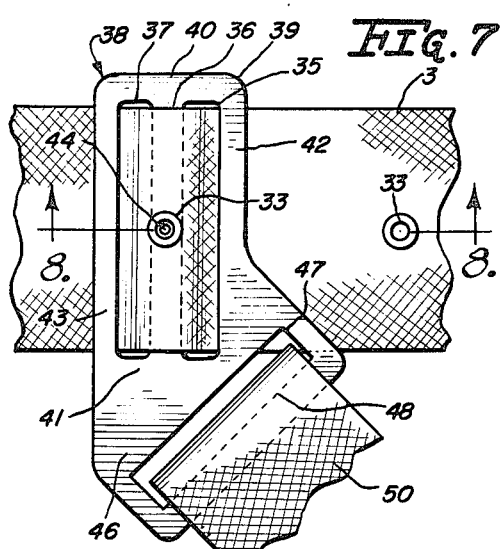
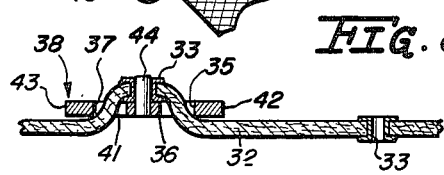
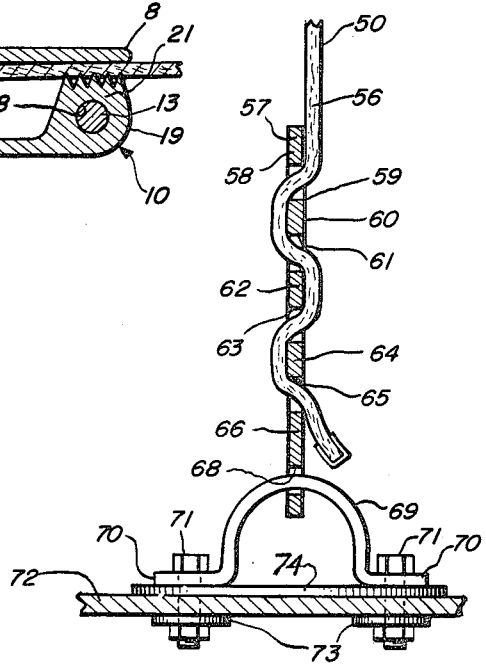
INVENTOR.
Arthur Sprague
BY John J. Kowalik
Atty.

United States Patent Office 3,174,798
Patented Mar. 23, 1965

3,174,798
AUTOMOBILE SAFETY BELT
Arthur Sprague, Chicago, Ill.
(117 Avery St., Apt. B, Hot Springs, Ark.)
Filed Sept. 18, 1963, Ser. No. 309,712
5 Claims. (Cl. 297—385)

This invention relates to safety belts for automobiles and the like, and more specifically to a novel safety belt of improved form affording greater safety and comfort to the user than heretofore available.

A general object of the invention is to provide a novel safety belt which comprises a waist-encircling belt portion with a quick-release belt buckle to facilitate its use.

A further object of the invention is to provide a novel safety belt which is not only easy to put on and take off but which does not inhibit normal activity of the user.

Another object of the invention is to provide a novel safety belt which may be applied to conventional attachments in current automobiles and which may be easily adapted for use in any vehicle.

The invention comprehends the provision of a novel belt buckle which comprises a pair of side straps adapted for connection to the flooring or frame of a vehicle, the belts passing between the seat and back portions of the vehicle seat structure and having novel buckles connected to their upper ends, the buckles admitting a waist encircling belt which is cinched about the waist of the user.

Another object of the invention is to provide a novel safety belt which has a waist portion adjustable in its attachments to the anchor belts to accommodate users of various girth so that it can be worn comfortably.

A further object of the invention is to provide a novel safety belt which comprises a waist-encircling loop connected at opposite sides to the floor structure by a pair of side belts which are passed under the backrest of a seat at such an angle that upon forward movement or lurch of the user's body as during an accident, the side belts will tend to straighten out and in doing so react against the yieldable nature of the back-rest member as well as the back edge of the seat member (it being understood these members being normally made up of interconnected springs and the like) whereby reducing the instantaneous shock imposed upon the body of the user to minimize injury by controlling movement of the user's body in an easing, gentle manner.

These and other objects and advantages inherent in and encompassed by the invention will become more readily apparent from the following specification and drawings, wherein:

FIGURE 1 is a fragmentary perspective view of a vehicle seat provided with my novel, improved safety belt unit;

FIGURE 2 is a side elevational view of the safety belt illustrated in FIGURE 1, with the seat being shown in dotted lines, and illustrating the attachment of the safety belt to the vehicle;

FIGURE 3 is a front elevational view of the novel safety belt, the seat being shown in phanton lines and the vehicle floor being shown in section taken essentially on line 3—3 of FIGURE 2;

FIGURE 4 is an enlarged front view of the quick-release buckle;

FIGURE 5 is a longitudinal sectional view of the buckle taken substantially on line 5—5 of FIGURE 4;

FIGURE 6 is a transverse sectional view taken on line 6—6 of FIGURE 4;

FIGURE 7 is an enlarged fragmentary side elevational view of one of the side buckles and portions of belting connected thereto;

FIGURE 8 is an enlarged sectional view taken substantially on line 8—8 of FIGURE 7; and FIGURE 9 is an enlarged vertical sectional view showing the attachment of the belt unit to the vehicle structure.

Describing the invention in detail and having particular reference to the drawings, there is shown my novel safety belt unit 2 which comprises a waist-encircling belt loop 3 which has free end portions 4 and 5, the end portion 4 being passed through an eye 6 in a base 7 of the body portion 8 of the buckle 10. The end portion 4 is formed into a loop and secured as by stitching at 11 to the adjacent portion of belt 3.

The buckle base 7 comprises a pair of laterally spaced ears 12 which project from the lateral edges of base 7 substantially normal thereto. The ears 12 are provided with coaxial openings which admit a pintle 13 therethrough, said pintle being in the form of a nut and bolt, the bolt having a head 14 at one end engaging the outer side 15 of one ear 12 and the nut 17 being threaded on the other end of said bolt and engaging the outer side 16 of the other lug.

The pintle passes through a bore 18 in an eccentric locking portion 19 of a locking latch generally designated 20, said eccentric portion 19 having a toothed section 21 which in the latching position engages the end portion 5 which is passed between the eccentric locking portion 19 and the base wall 7. The eccentric toothed section 21 penetrates the belt, which may be a cotton or synthetic webbing or leather etc., and urges the belt against wall 7. The latch 20 comprises a handle portion 22 which is connected to the eccentric portion. The handle extends over the base wall 7 and has an outturned finger hold 23 at its free end by which the latch is rotated in an outward direction against the latching bias of the torsion spring 25 which is sleeved over one end of pintle 13. The spring 25 has one end 26 extending normal to its axis into a slot 27 in the portion 19 at one side of a counterbore 28 which is coaxial with bore 18, the counterbore 28 admitting the spring 25 therein. The spring 25 has an axially extending end portion 30 which projects into an opening 31 (FIGURE 4) in an adjacent ear 12.

The belt 3 is provided at its side portions 32, 32 with adjusting means in the form of a series of longitudinally spaced reinforced eyelets 33, 33. Each intermediate portion 32 of the belt 3 is laced through a vertical slot 35 over a vertical locking bar 36 and through a vertical slot 37 in a side buckle 38. The side buckle 38 comprises a rectangular frame 39 which provides top and bottom sections or bars 40, 41 which interconnect with end bars 42, 43 and the intervening bar 36. Bar 36 is provided with a pin 44 which is selectively entered into a selected eye of the respective series of eyes 33.

The lower end portion 41 of each buckle 38 is integrated with a diagonal downwardly and rearwardly extending bracket or anchor portion 46 which is preferably disposed at an angle of 45° to the buckle portion 38. Anchor portion 46 is provided with a rectangular eye 47 through which there is looped the upper end portion 48 sewed at 49 to the remaining portion of a side strap 50.

Each side strap 50 is passed over the rear portion 51 of a vehicle seat 52 and under the lower edge 53 of a back-rest 54 of the seat 52 and is twisted intermediate its ends as at 55. The lower end portion 56 of each strap 50 is adjustably secured to an anchor buckle 57 by being laced behind bar 58, through slot 59, in front of bar 60 through slot 61, behind bar 62, through slot 63, in front of bar 64, through slot 65 and behind bar 66. The bars 58, 60, 62 and 64 and the lower bar 65 are interconnected by side bars 66, 67.

The lower bar 65 has an eye 68 which admits a U-shaped anchor bracket 69 therethrough. The bracket 69 has outturned flanges 70 which are apertured and admit bolts 71 therethrough which are secured to the vehicle frame 72 which as herein shown may be the floor which may be reinforced by a bottom plate 73 through which the bolts 71 are passed.

It will be seen that the bolts 71 pass through suitable apertures in the circular disks 74 which are placed on the top of the flooring 72.

Thus, it will be seen a novel, simple and effective safety belt has been disclosed which provides adjustment for different body sizes and is easy to apply and remove by the user.

It will be understood that the lengths of the side belts behind the resilient seat 52 and the lengths of the side belts from beneath the resilient back rest to the side buckles are positioned at such angles to the waist-encircling loop portion of the belt that upon the side belt 2 tending to straighten the seat and the back rest are deflected and yield resiliently to prevent injuries.

Having described a preferred embodiment of the invention, it will be readily apparent that various other forms will become readily apparent to those skilled in the art within the scope of the appended claims.

I claim:

1. For use with a vehicle having a seat including a generally horizontal seating portion and an upright back-rest portion and a floor structure beneath the seat, a safety belt comprising a waist-encircling loop portion oriented with the axis of the loop substantially vertical, a quick-release belt buckle connected to the loop portion for securing and releasing the loop portion with respect to the waist of the user, a pair of laterally spaced side belt portions flanking said loop portion and having upper ends, means adjustably securing said upper ends to respective sides of the loop portion for adjustment circumferentially with respect to the loop portion, said side belt portions extending between the back-rest portion and the seating portion downwardly to the floor structure and having lower ends thereadjacent, and means adjustably securing said lower ends to said floor structure to accommodate lowering and raising of said loop portion of the belt to the comfort of the user, and said means for adjustably securing the side belt portions to the loop portion each comprising a side buckle and said loop portion laced through the side buckle and having a plurality of circumferentially spaced eyelets, and said buckle having a pin selectively positioned into any of said eyelets.

2. The invention according to claim 1 and each side buckle having a bracket portion projecting angularly downwardly and rearwardly therefrom and having an eye receiving the upper end of the respective side belt.

3. For use with a vehicle having a seat including a generally horizontal seating portion, an upright back-rest portion and a floor structure beneath the seat, a safety belt comprising a waist-encircling main belt having side portions and a releasable fastening buckle connecting the side portions of the belt about the user, side buckles on respective side portions of the main belt, each side buckle having a rigid upper portion, positive releasable interengaging means on each side buckle upper portion and the respective side portion of the main belt for holding the side buckle in selected positions longitudinally spaced along the side portion of the main belt, each side buckle having a rigid lower portion projecting diagonally downwardly and rearwardly from the upper portion, a pair of side straps flanking the main belt and having upper ends secured to the lower portions of the respective side buckles, said side straps extending between the back-rest portion and the seating portion downwardly to the floor structure, and means securing the lower ends of the side straps to the floor structure.

4. For use with a vehicle having a seat including a generally horizontal seating portion and an upright back-rest portion and a floor structure beneath the seat, a safety belt comprising a waist-encircling main belt having side portions and a releasable fastening buckle connecting the side portions of the main belt about the user, side buckles on respective side portions of the main belt, each side buckle having a rigid upper portion, with a pair of vertically elongated slots slidably receiving the respective side portions in serpentine fashion throught the slots, said main belt being formed in each of of its side portions with a plurality of longitudinally spaced apertures, a locking pin projecting from the upper portion of each side buckle between the slots thereof and receivable selectively in the respective apertures of the associated side portion of the main belt whereby to releasably secure respective side buckles in adjusted positions at said opposite sides of the main belt, each side buckle having a rigid lower portion projecting downwardly and rearwardly from the upper portion of the side buckle, a pair of side straps flanking the main belt and having upper and lower ends, respective upper ends secured to the lower portions of respective side buckles, said side straps extending between the back-rest portion and the seating portion downwardly to the floor structure, and means securing said lower ends of the side straps to the floor structure.

5. The invention according to claim 4 and said means securing the lower ends of the side straps to the floor structure comprising each an inverted U-shaped bracket, rigid means connected to the lower ends of the straps and each having an elongated straight slot receiving the associated bracket therethrough, and means securing each bracket to rigid areas of the floor structure.

References Cited by the Examiner

UNITED STATES PATENTS

| 1,172,103 | 2/16 | Bennett | 297—385 |
| 1,897,882 | 2/33 | Beagan | 297—389 |
| 2,665,143 | 1/54 | Rasmussen | 297—385 X |
| 2,833,343 | 5/58 | Benson | 297—387 |
| 2,845,676 | 8/58 | Huber | 280—150 |
| 2,856,991 | 10/58 | Princiotta | 297—389 |
| 2,877,833 | 3/59 | Boles | 280—150 |
| 3,076,679 | 2/63 | Lorber | 297—385 |

FRANK B. SHERRY, *Primary Examiner.*